United States Patent
Painter

[11] 3,905,090
[45] Sept. 16, 1975

[54] METHOD OF MAKING SPIRAL WOUND GASKETS

[75] Inventor: John B. Painter, Flemington, N.J.

[73] Assignee: Johns-Manville Corporation, Denver, Colo.

[22] Filed: Nov. 23, 1973

[21] Appl. No.: 418,488

Related U.S. Application Data

[63] Continuation of Ser. No. 266,518, June 22, 1972, abandoned, which is a continuation of Ser. No. 26,306, April 7, 1970, abandoned, which is a continuation-in-part of Ser. No. 815,166, April 10, 1969, abandoned.

[52] U.S. Cl. ............... 29/455; 29/475; 277/204
[51] Int. Cl.² ............... B21D 39/00; B23P 19/04
[58] Field of Search ...... 29/455, 605, 475; 277/204, 277/234, 235

[56] References Cited
UNITED STATES PATENTS

| | | | |
|---|---|---|---|
| 816,478 | 3/1906 | Kirsching | 277/204 |
| 1,942,703 | 1/1934 | Hubbard et al. | 277/204 |
| 2,219,182 | 10/1940 | Granfield | 29/605 |
| 2,246,239 | 6/1941 | Brand | 29/605 |
| 2,442,313 | 5/1948 | Price | 277/204 X |
| 2,457,694 | 12/1948 | Lippincott | 277/204 X |
| 2,466,263 | 4/1949 | Nardin | 277/204 |

Primary Examiner—Charlie T. Moon
Attorney, Agent, or Firm—Robert M. Krone; James W. McClain

[57] ABSTRACT

This is a process for forming a spirally wound gasket. The gasket is formed by first closing a loop of strip metal of a predetermined circumference (hence also a predetermined diameter) and thereafter simultaneously spirally winding around the loop additional convolutions of metal and asbestos strips so that the asbestos strips provide a filler between successive spirals of metal. An outer convolution of metal is welded or otherwise secured to an adjacent underlying metal strip for maintaining the gasket from unwinding.

11 Claims, 14 Drawing Figures

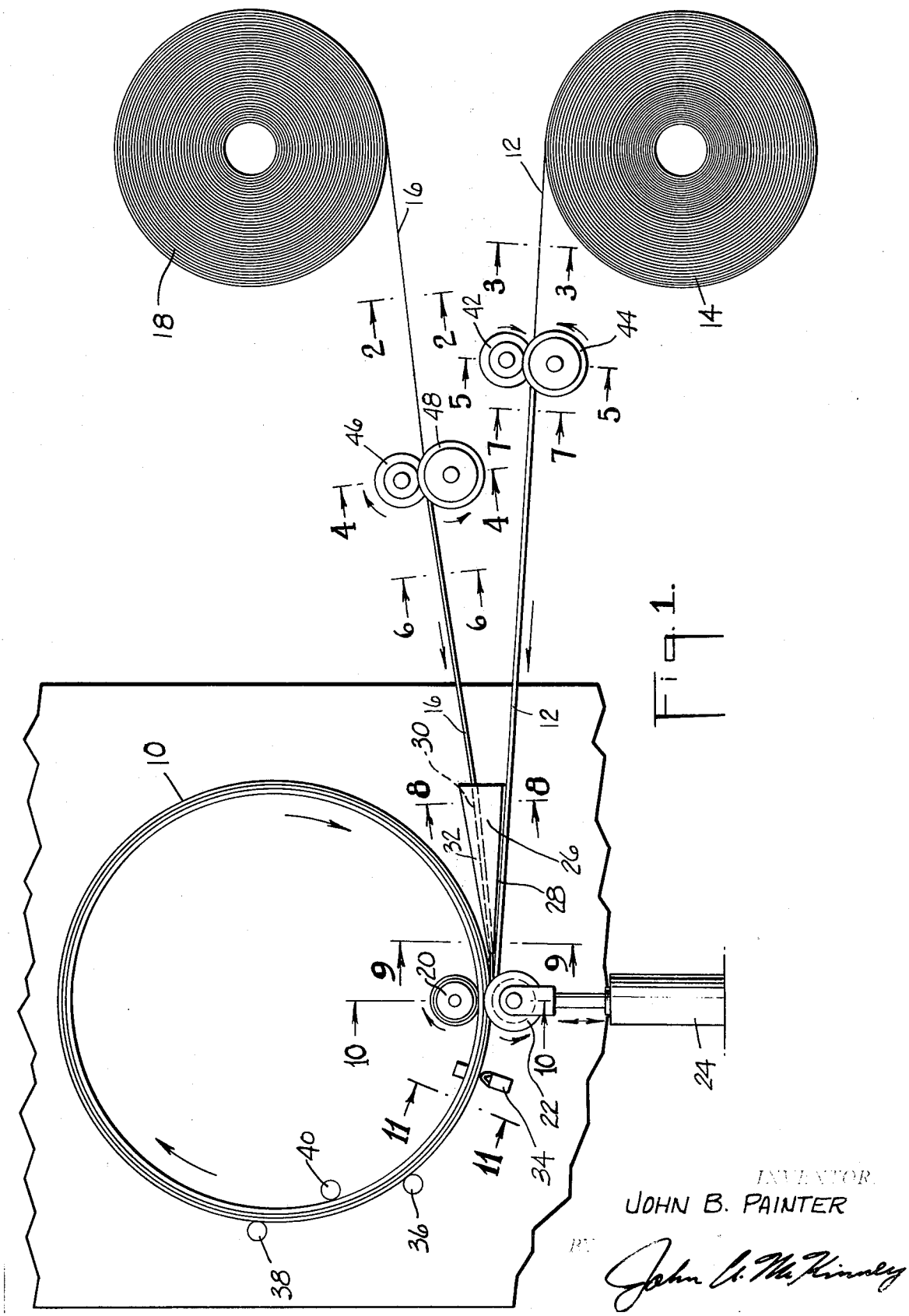

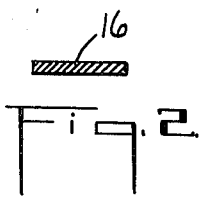
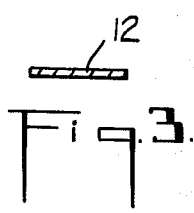
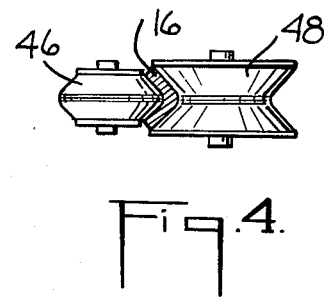
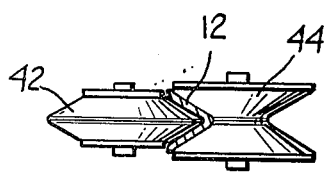
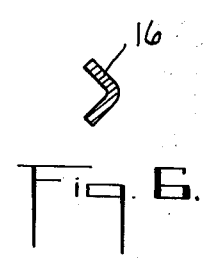
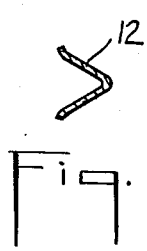
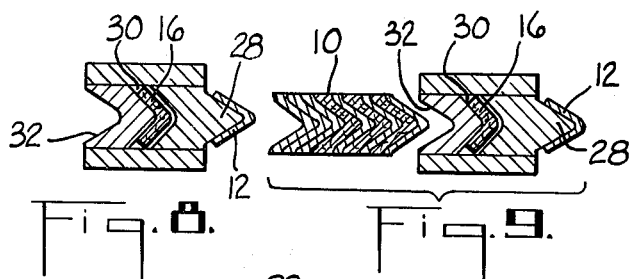
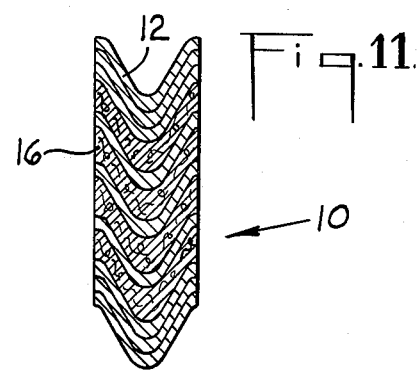
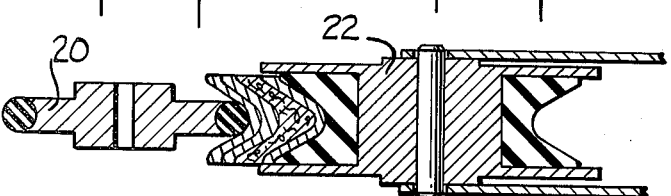
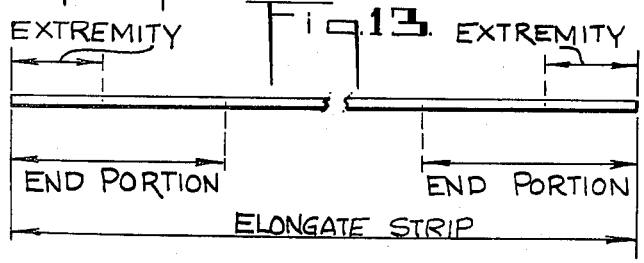
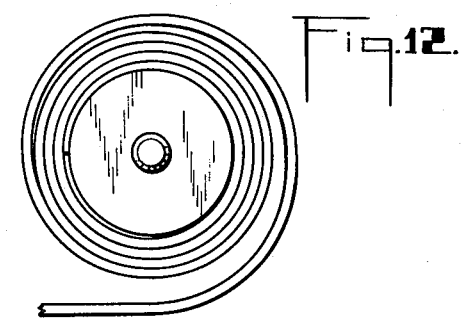
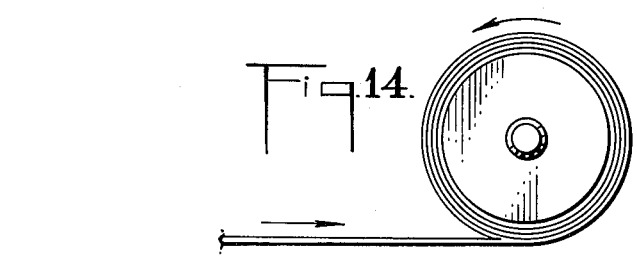

# METHOD OF MAKING SPIRAL WOUND GASKETS

This is a continuation of application Ser. No. 266,518 filed June 22, 1972, now abandoned, which is a continuation of application Ser. No. 26,306, filed Apr. 7, 1970, now abandoned, which is a continuation-in-part of application Ser. No. 815,166, filed Apr. 10, 1969, now abandoned.

BACKGROUND OF THE INVENTION

This invention relates to the manufacture of spiral-wound gaskets and a method of fabrication not requiring the conventional winding thereof on a mandrel. In particular, the invention relates to a process of winding spiral-wound gaskets and an apparatus employable in the method. The type of gasket formed by this invention is similar to the disclosures in U.S. Pat. Nos. 2,442,311, 2,339,479, 2,192,739, 2,339,478, 2,357,257, however, the invention is not limited to these illustrative gaskets.

It is common for spiral-wound gaskets to have one or more corrugations typically of a V-shape medially located longitudinally along the strip making up the spiral-wound gasket. For example, in the gaskets of each of the above cited patents, there is a V-shaped corrugation of this type.

In the making of a spiral-wound gasket, it has been possible only with great difficulty prior to this invention to practically produce on a commercial scale a spiral-wound gasket exceeding an outer diameter of about 50 inches. This is particularly true when a conventionally employed winding mandrel is utilized and filler is also spirally wound with the metal strips. Also, a winding mandrel becomes costly in greater diameters, and the greater diameter spiral-wound gaskets are difficult if not impossible to make when employing a winding mandrel.

BRIEF SUMMARY OF THE INVENTION

An object of this invention is a process for the winding of a spiral-wound gasket without the use of a winding mandrel.

Another object is a method employable for the production of spiral-wound gaskets of any desired outside and inside diameters, ranging from very small gaskets up to gaskets of 10 or 15 feet, for example, in outside diameter.

The above objects are successfully accomplished by the process and by the apparatus of this invention. The process comprises substantially simultaneously spirally winding metal and asbestos strips, or similar substance, upon itself so that adjacent convolutions of metal are separated by a filler material. The turns or convolutions comprise at least one metal strip and at least one filler strip of a compressible filler composition, whereby substantially each turn of said metal strip is separated from each of adjacent turns of said metal strip by a turn of said filler strip. The gasket may be formed on and supported by a table having a substantially flat face, but may be supported in other positions as well.

The gasket has substantially alternately occurring convolutions of the metal strip and the filler strip. The filler strip is sandwiched between separate convolutions of the metal strip with at least each metal strip preferably being continuous and preferably also the filler strip being continuous.

For this invention, the particular metal employed as the metal tape, as is well known by artisans of the prior art, is conventionally determined as dependent upon the intended use of the gasket. In other words, depending upon the nature of the environment which for example might be corrosive in one manner or another upon a particular metal, one metal is preferred over another. Accordingly, depending upon the particular desired end use, the metal may be any suitable and/or conventional metal which may be made into a tape sufficiently flexible and formable to build a spiral-wound gasket of the nature to which this invention is directed, typical but not all inclusive metals including metals such as stainless steel, titanium, nickel, alloys thereof, and the like.

Similarly, the filler strip or tape may be of any suitable and/or conventional material such as preferably asbestos paper. However, other materials include typically tapes of cotton, wool, polyfluoroethylene polymers or copolymers, regenerated cellulose, acetate rayon, glass fibers, and the like.

As an illustration of a typical preferred embodiment of this invention, a process of this invention may comprise initially forming a first convolution of a metal strip having a medially located V-shaped corrugation running longitudinally along the length of the tape, positioning (i.e., placing) the initial convolution substantially on its side, substantially flush with a substantially flat face of a table and making fast the first convolution as by welding the first convolution metal to metal of a part of a second convolution at a known circumference to thereby stabilize the general inside diameter of the first convolution. Thereafter additional lengths of the corrugated metal strip and the filler strip, such as asbestos paper, are fed onto the first convolution, whereby a spiral-wound gasket of multiple convolutions is formed lying flat on the flat surface. The gasket will resolve itself into a generally round shape. Then the outside convolutions of the metal strip are secured as by welding to thereby stabilize the gasket's outside diameter.

The table upon which the convolutions are formed may be a table adapted to revolve at a speed corresponding to the speed that strips are being wound, but may be a flat stationary surface.

Although many services for composite gaskets of the type to which this invention is directed will occur to those skilled in this art, a typical application of the gasket is its use to seal a joint between opposing flat faces of a pair of companion flanges of two aligned pipe sections through which typically a fluid under pressure will be conveyed.

As is well known in the art, such flanges are drawn together into engagement with the faces of the sealing gasket between the opposing flange faces until a seal is effected or until engagement of the compression limiting gage by the flange faces is possibly indicated by solid resistance which prevents further normal advancing of the flanges.

BRIEF DESCRIPTION OF THE DRAWINGS

In the drawings which are to be considered in conjunction with the specification, FIG. 1 is a general representation in plan view of the structure and process for practicing my invention;

FIG. 2 is a cross-sectional view of the filler strip taken along line 2—2 of FIG. 1;

FIG. 3 is a cross-sectional view of the metal strip taken along line 3—3 of FIG. 1;

FIG. 4 is a cross-sectional view of the filler strip crimping rollers taken along line 4—4 of FIG. 1;

FIG. 5 is a cross-sectional view of the metal strip crimping rollers taken along line 5—5 of FIG. 1;

FIG. 6 is a cross-sectional view of the crimped filler strip taken along line 6—6 as the strip moves toward the gasket;

FIG. 7 is a cross-sectional view of the crimped metal strip taken along line 7—7 as the strip moves toward the gasket;

FIG. 8 is a cross-sectional view of the feeder guide taken generally along line 8—8 of FIG. 1;

FIG. 9 is another cross-sectional view of the feeder guide taken generally along line 9—9 of FIG. 1;

FIG. 10 is a cross-sectional view of the forming rollers taken generally along line 10—10 of Fig. 1;

FIG. 11 is a cross-sectional view of the spirally wound gasket taken generally along line 11—11 of FIG. 1.

FIG. 12 is a representation of a spiral winding.

FIG. 13 is a representation of an elongate metal strip with portions bearing designations used in the claims.

FIG. 14 is a representation of the prior art relating to winding a spiral-type gasket on a mandrel.

The process defined or disclosed herein produces a gasket wound about an open air core and eliminates the need for a mandrel. This is particularly advantageous in larger diameters where mandrels are difficult to use and store.

FIG. 1 represents an overall process or flow of material to the location where the gasket is being spirally wound. The gasket is generally designated by the numeral 10. A strip of metal 12 is fed onto the gasket from a rolled coil 14. The strip in the alternative may be in straight bar form supported on a table or the like not shown here. In the same manner, mating filler strip 16 of asbestos in the preferred embodiment is fed from rolled form 18. This too may be in a straight strip rather than in rolled form.

A pair of rollers 20, 22 rotate the gasket during its spiral build up. Each roller is rubber faced at its periphery so as not to damage the srips during winding. Roller 20 is power driven from an electric motor not shown. Roller 22 is a positionable roller connected with an air or hydraulic cylinder 24. In operation roller 22 is normally urged toward roller 20 and against the gasket 10. It can be selectively retracted from the position shown in FIG. 1 as required.

Numeral 26 designates generally a guide which comprises a guide 30 for the filler strip 16 and guide 28 for metal strip 12.

See FIGS. 8 and 9 for their general cross-sectional configuration. The metal strip guide comprises a V-shaped portion 28 adapted to nest with the V-shape of the crimped metal strip 12. Another V-shaped slot 30 is provided in guide 26 for the passage of a crimped section of the filler strip 16. A still further portion of the guide is provided with a V-section 32 facing the V-shape of gasket 10 being formed, but normally there is no contact therebetween. Guide 26 terminates some short distance before rollers 20, 22 and serve to guide metal strip 12 and filler strip 16 into the roller in proper adjacent and substantially mating relationship. When the strips reach rollers 20, 22 they are spirally formed onto gasket 10.

FIGS. 2 and 3, respectively, show the filler and metal strips in original flat form. FIGS. 4 and 5 show rollers for providing a longitudinal crimp or elongate corrugation in the strips in general accordance with the cross-sectional views of FIGS. 6 and 7.

As strips 12 and 16 pass through guide 26, V-shaped paths 28 and 30 are converging and at their exit are close together and directed toward drive rollers 20, 22.

On the exit side of rollers 20, 22 is located a spot welding station which is designated by the numeral 34. Still further to the left of drive rollers 20, 22 is located plural forming pins 36, 38 and 40. These pins are manually selectably positionable relative to rollers 20, 22 for initially bending or curving the first metal strip passing from the rollers so as to form the strip back upon itself to define a loop having an open air core. When properly positioned one or more of the pins cause the strip to curve back upon itself for entry again through rollers 20, 22.

The following will relate the steps of the process for building a spirally wound gasket according to my invention which is generally disclosed in FIG. 1. First, a length of metal strip 12 is fed through crimping rollers 42, 44 and past guide portion 28 of guide 26 through rollers 20, 22. Roller 22 is urged toward roller 20 and against the strip. Roller 20, and at least one of rollers 42, 44 and at least one of rollers 46, 48 are power driven at synchronized speed. But, at first only a metal strip 12 is fed through guide 26 to rollers 20, 22. Normally the metal strip would exit from rollers 20, 22 in a straight line. However, to provide the metal strip with a free loop upon itself, one or more of pins or guides 36, 38 or 40 are manually so positioned to deflect and/or guide the terminal portion of the strip in a broad curving path so that it loops back on itself at about groove 32 for entrance again into rollers 20, 22. After the end is passed through these rollers and passed beyond spot welding station 34, the loop is welded in at least one place to secure it in fixed position. But, before the weld is made the desired circumference of this first loop is established linearly along the metal strip and, of course, becomes the circumference. When the circumference is determined the diametral dimension is proportionally related thereto. The first loop will be weak and in need of support. Some flat surface such as a table 50(revolving or not) is provided to support this embryonic loop and subsequent loops which define the gasket. The loop or gasket may be supported by other structure as well, for example vertically by bars or rollers. From one to several metal strips may be wound upon the first loop. Subsequently, a strip of asbestos is fed through slot 30 in guide 26 along beside metal strip 12 onto the gasket to provide a separation or filler between the metal convolutions. This build up continues until the desired outside diameter of the gasket is reached. The last convolution or convolutions should be metal only to provide for spot welding therebetween at station 34 so as to secure the finished gasket together.

The first loop formed and next few successive ones may not be round. But, as the gasket is further spirally wound to build up the gasket, internal forces will operate to round out the shape.

FIG. 11 is illustrative of a cross-section of the finished gasket.

FIG. 12 is illustrative only of what is meant by the term "spiral" or "spirally winding." All convolutions are generally in the same plane with each successive one of greater radius.

FIG. 13 is only to illustrate that portion of the strip to which certain terminology in the claims refers. The end portion is a somewhat indeterminate portion of the metal strip as needed to form a first loop.

FIG. 14 is a representation of the prior art where a mandrel is required in the manufacturing process.

Grooves provided in the strips resist by their inner action lateral separation of one convolution from another.

This invention has provided for the first time an economic means of making gaskets of very large diameters. It eliminates the mandrel which in the larger diameters is extremely expensive and awkward to wind. Then too, when coupled with all the possible mandrel diameters that are required to meet dimension needs of the industry, inventory of mandrels upon which to wind under the old system becomes prohibitive. This is a substantial advance in the art for winding gaskets of the type disclosed herein.

I claim:

1. The process of making a spirally wound axially compressible annular gasket of the type adapted to be pressure sandwiched between generally axially aligned surfaces to be sealed comprising:
   a. bending and guiding an elongate metal strip to convolute an end portion of the elongate metal strip upon itself to define a closed free loop configuration of predetermined circumference encompassing an open air core, and fixedly securing the elongate metal strip in the closed free loop configuration of predetermined circumference;
   b. spirally winding said elongate metal strip and a filler strip upon the closed loop to build up further convolutions in a radial direction with the convolutions of said filler strip separating at least some of the adjacent convolutions of the metal strip for defining a filler therebetween,
   c. fixedly securing a portion of an outer convolution of the metal strip to an underlying convolution thereof for securing the formed gasket in assembed relation, and
   d. supporting substantially the entire length of the side edge of the convolutions upon a support surface during formation of the closed loop and the subsequent spiral winding of said elongate metal strip and said filler strip upon the closed loop.

2. The claimed process of claim 1 wherein the securing of the metal strip to form a closed loop is between an extremity of the end portion and another portion of said metal strip.

3. The claimed process of claim 2 wherein said securing is by welding and said filler strip comprises asbestos.

4. The claimed process of claim 1 wherein the securing of an outer convolution of metal strip to an underlying convolution is between an extremity of the other end portion and another portion of said metal strip.

5. The claimed process of claim 1 wherein at least a partial convolution of metal strip alone is spirally wound upon said closed loop and the gasket is concluded at its outer periphery with at least a partial convolution of metal strip alone.

6. The claimed process of claim 1 wherein the gasket, during spiral winding, tends by internal forces to assume an annular form of substantially constant diameter.

7. The claimed process of claim 1 wherein the gasket in the process of being spirally wound is supported on a generally horizontal surface.

8. The claimed process of claim 1 wherein said strips are provided with a longitudinal extending corrugation whereby upon being spirally wound into a gasket mesh with one another to provide resistance to lateral separation.

9. The claimed process of claim 1 wherein the gasket, during spiral winding thereon, tends to assume an annular form of substantially constant diameter and said filler strip comprises asbestos.

10. The process of making a spirally wound axially compressible annular gasket of the type adapted to be pressure sandwiched between generally aligned surfaces to be sealed comprising:
    a. bending and guiding an elongate strip of metal between drive rollers and convoluting an end portion of the elongate metal strip again between the rollers and upon itself to define a closed free loop configuration of predetermined circumference encompassing an open air core, and fixedly securing the elongate metal strip in the closed free loop configuration of predetermined circumference;
    b. feeding further portions of the strip of metal through the drive rollers and feeding a filler strip through the drive rollers in side by side relationship and spirally winding in convolutions upon said loop to build up a gasket in a radial direction with at least some of metal strip convolutions being separated by filler strip convolutions defining a filler therebetween;
    c. supporting substantially the entire length of the side edge of the convolutions of the gasket upon a support surface during building of the gasket; and
    d. fixedly securing a portion of an outer convolution of the strip of metal to an underlying convolution thereof to secure the formed gasket in assembled relation.

11. The process as described in claim 10 wherein the strips prior to passing between the drive roller pass through crimping rollers which provide a longitudinal corrugation thereon whereby upon being spirally wound in forming the gasket provides resistance to later separation.

* * * * *